Oct. 1, 1946.    R. M. WILSON    2,408,541
FAUCET
Filed March 9, 1944    2 Sheets-Sheet 1
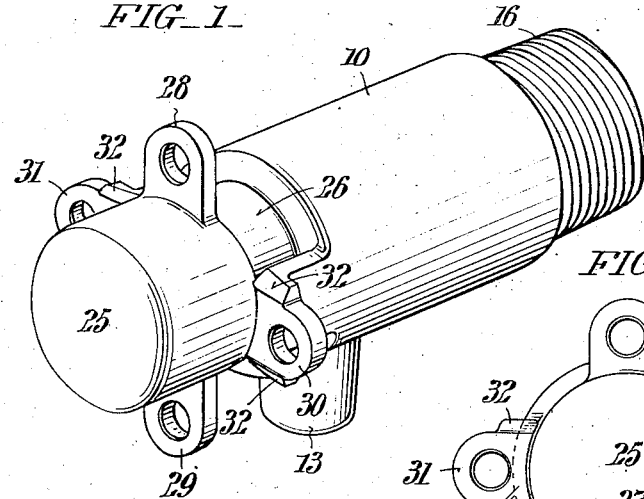
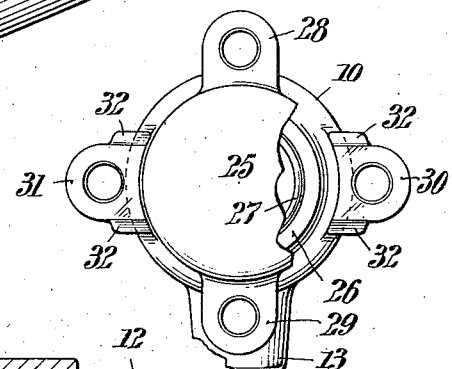
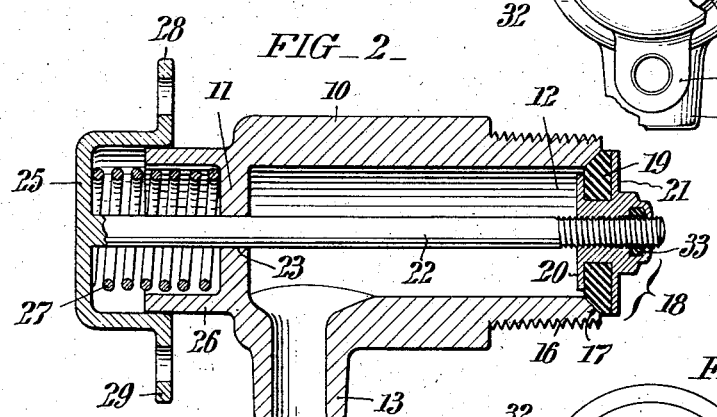
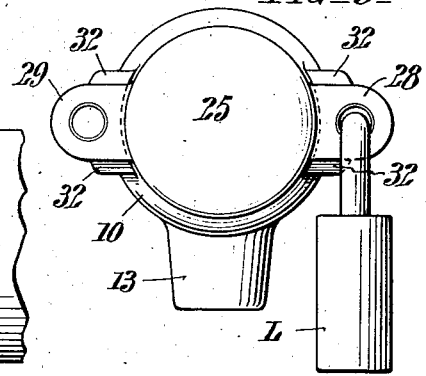
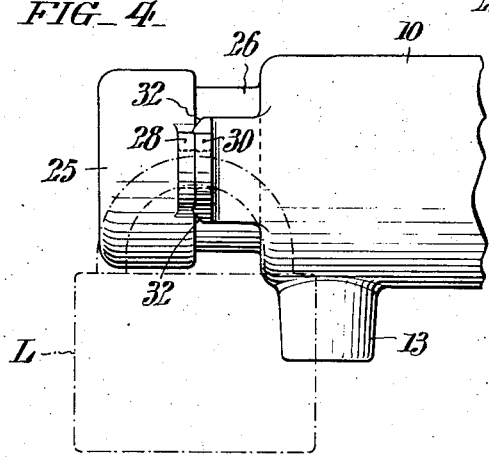
INVENTOR:
Ronald M. Wilson,
BY Paul & Paul
ATTORNEYS.

Oct. 1, 1946.   R. M. WILSON   2,408,541
FAUCET
Filed March 9, 1944   2 Sheets-Sheet 2
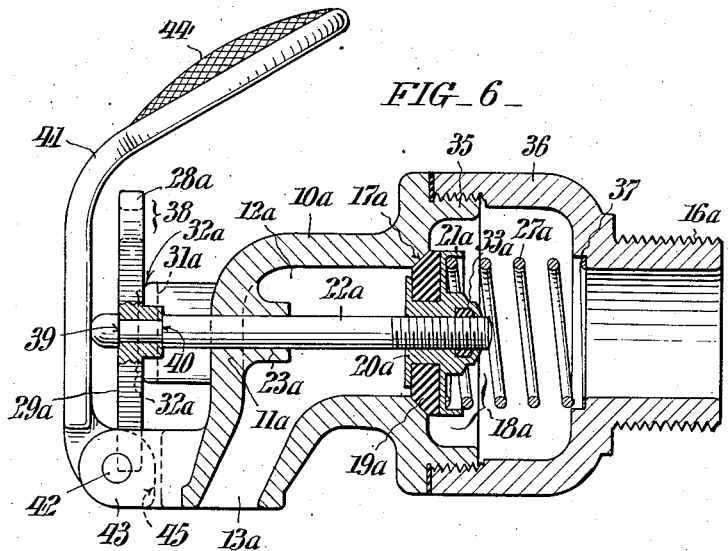
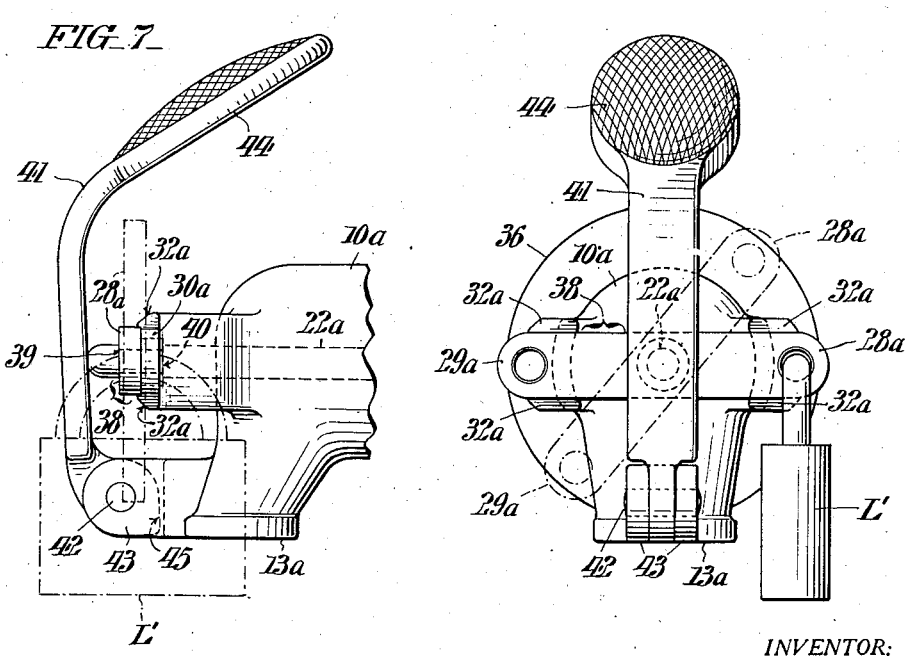
INVENTOR:
Ronald M. Wilson, Patented Oct. 1, 1946

2,408,541

UNITED STATES PATENT OFFICE 2,408,541

FAUCET

Ronald M. Wilson, Devon, Pa., assignor, by mesne assignments, to William M. Wilson's Sons, Inc., Lansdale, Pa., a corporation of Pennsylvania Application March 9, 1944, Serial No. 525,654

10 Claims. (Cl. 251—163)

This invention relates to faucets. More especially it has reference to faucets of the self-closing type designed for use with barrels or drums, and operable by exertion of direct pressure upon the protruding ends of their valve stems.

Amongst the aims of my invention are to simplify the construction of faucets of the kind referred to with a view toward reducing production costs; to provide for the locking of such faucets against unauthorized operation; and to insure against the possibility of leakage through the faucets when locked in closed position.

How the foregoing and other objects and advantages can be readily realized in practice will appear from the attached drawings wherein Fig. 1 is a perspective view of a faucet conveniently embodying my invention.

Fig. 2 is a longitudinal sectional view of the faucet.

Fig. 3 shows the front end elevation of the faucet with a portion of its actuating press button broken away to expose portions to the rear thereof.

Fig. 4 is a fragmentary view in side elevation with the faucet locked against use.

Fig. 5 is an end view like Fig. 3 but corresponding to Fig. 4.

Fig. 6 is a view corresponding to Fig. 2 showing a modified embodiment of my invention.

Fig. 7 is a fragmentary view showing the modified faucet in side elevation; and

Fig. 8 shows the modified faucet in front end elevation.

As herein shown, my improved faucet has a body 10 which is closed at its outer end as at 11 and open at its other or inlet end as at 12, and which has a lateral outlet 13 (Fig. 2). The inlet end 12 of the body 10 is externally threaded as at 16 so that the faucet may be screwed into the bunghole of the barrel or tank with which it is to be used. Cooperative with a seat 17 at the inlet end of the faucet body is a closure member 18 with a circumferentially beveled washer 19 of resilient material like rubber held between rigid backing disks 20 and 21 in engagement with screw threads at the inner end of a stem 22. From Fig. 2 it will be noted that the stem 22 passes out through a bearing 23 in the closed end portion 11 of the body 10 and has integrally formed with it or secured to it at its protruding end, a button head 25, which, as will presently be explained, also serves as a keeper element. As shown, the head 25 is hollow and slidably engaged over an axial annular guide boss projection 26 at the closed end of the body 10. The helical compression spring 27 concealed in a hollow jointly formed by the button head 25 and the boss 26 and surrounding the stem 22 serves to normally maintain the closure member 18 yieldingly in engagement with its seat. Projecting laterally from the button head 25 are diametral ears 28 and 29 which are normally positioned as shown in Figs. 1, 2 and 3 but which upon partial rotation of the head can be brought into registry with similar ears 30 and 31 at opposite sides of the body 10. As shown in Figs. 1, 3 and 4, each of the ears 30, 31 is formed along its opposite side edges with inclined cam ledges 32 for a purpose presently explained.

In use, the faucet is opened by exertion of pressure upon the button head 25, whereby, through the medium of the stem 22, the closure member 18 is moved away from its seat 17 to allow free fluid flow from the body through the outlet 13. When it is desired to secure the faucet against unauthorized use, the button head 25 is turned through a quadrant in one direction or the other from the position of Figs. 1 and 3 to that of Figs. 4 and 5. During this movement, the ears 28, 29 on the button head 25 are forced over the cam ledges 32 of the ears 30, 31 on the body 10 as a consequence of which the valve stem 22 is drawn outwardly and the beveled washer 19 further compressed with attendant tighter seating of the closure member 18. Upon eventual registry of the ears 28, 29 on the head 25 with the ears 30, 31 on the body 10, said head will recede slightly as its ears drop into the intervals between the cam ledges 32 on said ears 30, 31. With this accomplished, a padlock such as indicated at L in Figs. 4 and 5 is applied to one of the two registering pairs of ears 28, 30. Wear can be compensated for as may be required from time to time by adjusting the closure member 18 along the threaded portion of the stem 22, the packing shown at 33 insuring against leakage along the threads when the faucet is closed.

Referring now to the modified embodiment shown in Fig. 6, it will be seen that the faucet body 10a is provided with a rearward threaded boss 35 on which is screwed a hollow extension member 36 which surrounds the seat 17a, and which provides the threaded neck 16a whereby the faucet is screwed into the bunghole of the barrel or tank. One end of the spring 27a is engaged in a recess formed in the element 21a of the closure member 18a and the other end in a recess 37 in the rear wall of the extension 36 so as to act upon said closure member from the rear. Instead of being formed on a cap as in the first embodiment, the ears 28a, 29a are provided by a separate keeper element 38 which is held in place between spaced shoulders 39 and 40 (Fig. 6) at the outer end of the faucet stem 22a and said element 38 with capacity for being turned about said stem into registry with the ears 30a, 31a on the faucet body 10a. As a means for operating the faucet I have here additionally shown an upstanding press lever 41 which is pivoted at 42 to a bifurcated lug 43 projecting forwardly from the faucet body 10a. The upper end of the lever 41 is inclined rearwardly so as to overhang the faucet body 10a and formed with an elliptical hand press pad 44 whereof the upper surface is roughened as conventionally indicated. The lever 41 is restrained from falling forward from the normal vertical position in which it is shown through contact of the flat edge 45 tangential to the curvature of its rounded fulcrum portion with the bottom of the clevis in the lug 43 on the faucet body 10a. In order to preclude the necessity for repetitive description, all other component elements of the modified faucet not specifically referred to but having their counterparts in the first described embodiment are designated by the same reference numerals previously employed with addition, however, in each instance, of the letter "a" for convenience of ready distinction. The modified faucet is operated simply by pressure of the hand upon the pad 44 as a result of which the lever 41 is moved inwardly, this being attended by corresponding movement of the stem 22a and the displacement of the closure member 18a from its seat 17a. Locking of the faucet is effected in generally the same manner as described in connection with the first embodiment, i. e., by turning the keeper element 38 from the normal inactive dot-and-dash line angular position which it normally occupies to the full line position shown in Figs. 7 and 8, whereupon the padlock L' is applied to prevent subsequent unauthorized operation.

Having thus described my invention, I claim:

1. In a faucet of the character described, an axially-straight hollow body closed at one end and open at the other, and having a lateral outlet and an ear adjacent its closed end; a closure member with a resilient portion adapted to close against a seat to normally prevent flow through the body; spring means to normally maintain the closure member in engagement with its seat; a stem extending from the closure member through the closed end of the body and axially movable against the spring pressure to open the valve; and a rotatable keeper element at the outer end of the stem having an ear which, upon partial rotation of said element from a normal inactive position is brought into registry with the ear on the body to permit application of a padlock or the like.

2. A faucet according to claim 1, wherein the keeper element is in the form of a hollow press button head, which, jointly with an interengaging hollow guide boss therefor on the faucet body, provides a closed cavity for accommodation and concealment of the spring means.

3. A faucet according to claim 1, further including cam means operative as the ear of the keeper element is brought into registry with the ear on the body to induce an outward draw on the stem and thereby insure tighter engagement of the closure member with its seat when the faucet is locked.

4. A faucet according to claim 1, wherein a cam surface on the body ear cooperates with the ear of the keeper element as the latter is brought into registry with the body ear, to induce an outward draw upon the stem and thereby insure tighter engagement of the closure member with its seat when the faucet is locked.

5. A faucet according to claim 1, wherein raised cam ledges along opposite side edges of the body ear individually cooperate with the ear on the keeper element depending upon the direction in which said element is rotated incident to registry of the ear of the latter with said body ear, to induce an outward draw upon the stem and thereby insure tighter engagement of the closure member with its seat when the faucet is locked; and wherein under the influence of the resilient portion of the closure member after registry is effected, the ear on the keeper element is caused to recede slightly into full contact with the body ear in the interval between the two ledges.

6. A faucet according to claim 1, wherein the closure member is adjustable along the stem to permit compensation for wear.

7. A faucet according to claim 1, wherein the closure member has a screw threaded connection with the stem for the purposes of adjustment in compensating for wear; and wherein sealing means incorporated with said closure member precludes leakage along the threads of said stem when the valve is closed.

8. A faucet according to claim 1, wherein the keeper element is rotatably mounted between opposed shoulders on the stem.

9. A faucet according to claim 1, further including an actuating press lever which is pivotally connected to the faucet body and which is adapted to bear against the outer end of the stem.

10. A faucet according to claim 1, wherein the faucet body has a chamber adjacent its open end surrounding the seat, and wherein the spring means is disposed within said chamber and acts upon the closure member from the rear.

RONALD M. WILSON.